US006577346B1

(12) United States Patent
Perlman (10) Patent No.: US 6,577,346 B1
(45) Date of Patent: Jun. 10, 2003

(54) RECOGNIZING A PATTERN IN A VIDEO SEGMENT TO IDENTIFY THE VIDEO SEGMENT

(75) Inventor: Stephen G. Perlman, Palo Alto, CA (US)

(73) Assignee: WebTV Networks, Inc., Mountain View, CA (US)

( * ) Notice: Subject to any disclaimer, the term of this patent is extended or adjusted under 35 U.S.C. 154(b) by 0 days.

(21) Appl. No.: 09/490,885

(22) Filed: Jan. 24, 2000

(51) Int. Cl.[7] .......................... H04N 11/00; H04N 7/00
(52) U.S. Cl. .......................... 348/460; 725/19; 358/908
(58) Field of Search ................................ 348/460, 907; 386/1, 46; 358/908; 725/19; H04N 11/00, 7/00

(56) References Cited

U.S. PATENT DOCUMENTS

| | | | | |
|---|---|---|---|---|
| 3,919,479 A | | 11/1975 | Moon et al. ............... 179/1 SB |
| 4,450,531 A | * | 5/1984 | Kenyon et al. ................ 725/19 |
| 4,677,466 A | | 6/1987 | Lert, Jr. et al. ............... 358/84 |
| 4,697,209 A | * | 9/1987 | Kiewit et al. .................. 725/19 |
| 4,750,213 A | * | 6/1988 | Novak ......................... 348/722 |
| 4,843,562 A | * | 6/1989 | Kenyon et al. ................ 725/22 |
| 5,019,899 A | * | 5/1991 | Boles et al. .................. 725/19 |
| 5,210,820 A | * | 5/1993 | Kenyon ...................... 704/200 |
| 5,532,950 A | * | 7/1996 | Moses et al. .......... 364/724.19 |
| 5,668,917 A | * | 9/1997 | Lewine ........................ 348/907 |
| 5,870,151 A | * | 2/1999 | Korber ........................ 348/553 |
| 5,973,723 A | * | 10/1999 | DeLuca ....................... 348/907 |
| 5,999,689 A | * | 12/1999 | Iggulden ..................... 348/907 |
| 6,160,950 A | * | 12/2000 | Shimazaki et al. ........... 386/46 |
| 6,169,542 B1 | * | 1/2001 | Hooks et al. ................ 345/327 |
| 6,173,271 B1 | * | 1/2001 | Goodman et al. .......... 348/907 |
| 6,263,505 B1 | * | 7/2001 | Walker et al. .............. 725/110 |
| 2001/0013124 A1 | * | 8/2001 | Klosterman et al. .......... 725/36 |

* cited by examiner

Primary Examiner—John Miller
Assistant Examiner—Trang U. Tran
(74) Attorney, Agent, or Firm—Workman, Nydegger & Seeley (57) ABSTRACT

A method and system are described for identifying video segments (e.g., commercials or television programs) without using any identification data that may or may not be provided in the non-displayed overscan portion or the vertical blanking interval of the video signal. Instead, the video segment is identified by recognizing patterns in the viewable portion of the video image data and/or in the video sound data. If the pattern is unique to a specific video segment, that video segment is identified by, for example, looking up the pattern in a table correlating patterns with video segment identifications. Any number of functions may be performed using this identification.

35 Claims, 6 Drawing Sheets

RECOGNIZING A PATTERN IN A VIDEO SEGMENT TO IDENTIFY THE VIDEO SEGMENT

BACKGROUND OF THE INVENTION

1. The Field of the Invention

The present invention relates to computers and data processing systems. Specifically, the present invention relates to a method and system for recognizing a pattern in a video segment to identify the video segment.

2. The Prior State of the Art

Video data includes moving image data and associated sound data which, when realized on a television or other equivalent device, allow a user to view and hear video segments. Such video segments might include, for example, a commercial, a movie, a television program, a news broadcast, a talk show, a cartoon, or any other identifiable segment of video data.

It is desirable to be able to automatically identify video segments. Conventionally, data representing the identity of the associated video segment is provided in the vertical blanking interval of the video signal. The "vertical blanking interval" is an off-screen, non-viewable portion of the video signal that is sent between each video frame. In the National Television Standards Committee (NTSC) format widely used in the United States, Canada, Japan, South Korea and several Central and South American countries, the vertical blanking interval corresponds to the last 45 lines of the 525 lines in the video frame. Other television formats also have similar vertical blanking intervals between frames.

An advantage of using the vertical blanking interval to transmit identification data is that the data within the vertical blanking interval is transparent to the viewer. Since the vertical blanking interval corresponds to a non-viewable, off-screen portion of a video signal, the viewable portion of the image is not affected by the identification data. Furthermore, the associated audio data is also not affected. Thus, the viewer's experience in viewing and hearing the video segment is not degraded by data identifying the video segment.

Unfortunately, the use of the vertical blanking interval to identify video segments suffers in that the entity desiring to automatically identify the video segment may have little or no control over whether that identification data gets included in the vertical blanking interval. For example, a typical viewer, out of curiosity, might like to have a video segment automatically identified using identification data in the vertical blanking interval. Furthermore, television and associated peripheral device manufacturers might like to be able to automatically identify video segments in order to provide services to the viewer such as video segment blocking. Even the producer of the video segment may have little control over the data included in the vertical blanking interval. For example, a cable company or other distributor might cut data out the vertical blanking interval altogether during distribution of the video segment.

Another technique of including information in a video signal is encoding it in the overscan portion, which represents the portion of the video segment that lies outside of the normal rectangular viewing area of a television. For example, bar codes and the like can be transmitted in the overscan portion. However, such information can be lost or made unusable prior to the signal being received by the viewer. Further complicating the situation, restrictions on the inclusion of identification data in the overscan portions of the video segment or in the vertical blanking interval may also be imposed by law in some jurisdictions. For example, in Japan, such identification information is prohibited unless a special license is obtained.

In light of these problems, what is desired is a method and system for automatically identifying a video segment without relying on data in the overscan portion or the vertical blanking interval of the video signal.

SUMMARY OF THE INVENTION

The present invention overcomes the above-mentioned difficulties by identifying video segments (e.g., commercials or television programs) without using any identification data that may or may not be provided in the non-displayed overscan portion of the video signal. Instead, the video segment is identified by recognizing patterns in the viewable portion of the video image data and/or in the video sound data. If the pattern is unique to a specific video segment, that video segment is identified by, for example, looking up the pattern in a table or another database that correlates or associates patterns with video segment identifications. Any number of functions may be performed using this identification. The present invention is not restricted to any one of these functions.

The identification is automatic. Thus, the identification does not require any input from a viewer, thus avoiding inconvenience for the viewer. Furthermore, the identification does not require the inclusion of identification data in the non-displayed portions of the video segment such as in the vertical blanking interval. Thus, the video segment may be identified even when distributors remove identification data from the vertical blanking interval or the overscan portion of the video signal.

As stated above, some jurisdictions might restrict any data identifying the video segment from being included in any non-displayed portions of the video segment. The present invention does not rely on identification data in the non-displayed portions of the video segment in order to identify the video segment. Thus, the video segment may be identified even in these jurisdictions.

Additional objects and advantages of the invention will be set forth in the description which follows, and in part will be obvious from the description, or may be learned by the practice of the invention. The objects and advantages of the invention may be realized and obtained by means of the instruments and combinations particularly pointed out in the appended claims. These and other objects and features of the present invention will become more fully apparent from the following description and appended claims, or may be learned by the practice of the invention as set forth hereinafter.

BRIEF DESCRIPTION OF THE DRAWINGS

In order that the manner in which the above-recited and other advantages and objects of the invention are obtained, a more particular description of the invention briefly described above will be rendered by reference to specific embodiments thereof which are illustrated in the appended drawings. Understanding that these drawings depict (only typical embodiments of the invention and are not therefore to be considered limiting of its scope, the invention will be described and explained with additional specificity and detail through the use of the accompanying drawings in which.

DETAILED DESCRIPTION OF THE PREFERRED EMBODIMENTS

In accordance with the present invention, a video segment is automatically identified. However, the video segment is identified by recognizing patterns in the viewable portion of the video segment, and not by relying on any identification data that is included in the non-displayed portions of the video segment such as the vertical blanking intervals or the overscan region. The video segment might be, for example, a commercial, a television program, or any other identifiable portion of video data. Although not required, an electronic device may perform functions based on the automatic identification of the video segment.

Since the identification does not require any input from a viewer, the identification does not inconvenience the viewer. Furthermore, the identification does not require the inclusion of identification data in the vertical blanking interval or the overscan portion of the video signal. Thus, the video segment may be identified even when distributors omit the data in the vertical blanking interval, and even in jurisdictions which prohibit the inclusion of the identification data in the non-displayed portions of the video segment.

The invention is described below by using diagrams to illustrate either the structure or processing of embodiments used to implement the system and method of the present invention. Using the diagrams in this manner to present the invention should not be construed as limiting of its scope. The embodiments of the present invention may comprise a special purpose or general purpose computer including various computer hardware, as discussed in greater detail below. The embodiments may further comprise multiple computers linked in a network environment.

Embodiments within the scope of the present invention also include computer readable media having executable instructions or data fields stored thereon. Such computer readable media can be any available media which can be accessed by a general purpose or special purpose computer. By way of example, and not limitation, such computer readable media can comprise RAM, ROM, EEPROM, CD-ROM or other optical disk storage, magnetic disk storage or other magnetic storage devices, or any other medium which can be used to store the desired executable instructions or data fields and which can be accessed by a general purpose or special purpose computer. Combinations of the above should also be included within the scope of computer readable media. Executable instructions comprise, for example, instructions and data which cause a general purpose computer, special purpose computer, or special purpose processing device to perform a certain function or group of functions.

Although not required, the invention will be described in the general context of computer-executable instructions, such as program modules, being executed by a personal computer. Generally, program modules include routines, programs, objects, components, data structures, etc. that perform particular tasks or implement particular abstract data types. The invention will also be described by making reference to documents, which generally include or are defined by encoded data structures stored in a computer-readable medium or a computer memory device. The encoded data structures of documents often represent words, numbers, or other expression and generally may be generated, edited, displayed and/or stored using a computer.

In one embodiment, the invention is used in a system known as WebTV®, manufactured by WebTV Networks, Inc., of Mountain View, Calif., which uses a conventional television screen or another display unit in combination with a networked computer for composing, sending and receiving e-mail, browsing the World Wide Web (Web), accessing other segments of the Internet, and otherwise displaying information. A WebTV® system uses standard telephone lines, Integrated Services Digital Network (ISDN) lines, cable lines associated with cable television service, or the like to connect to the Internet or other wide area networks.

Figure 1:
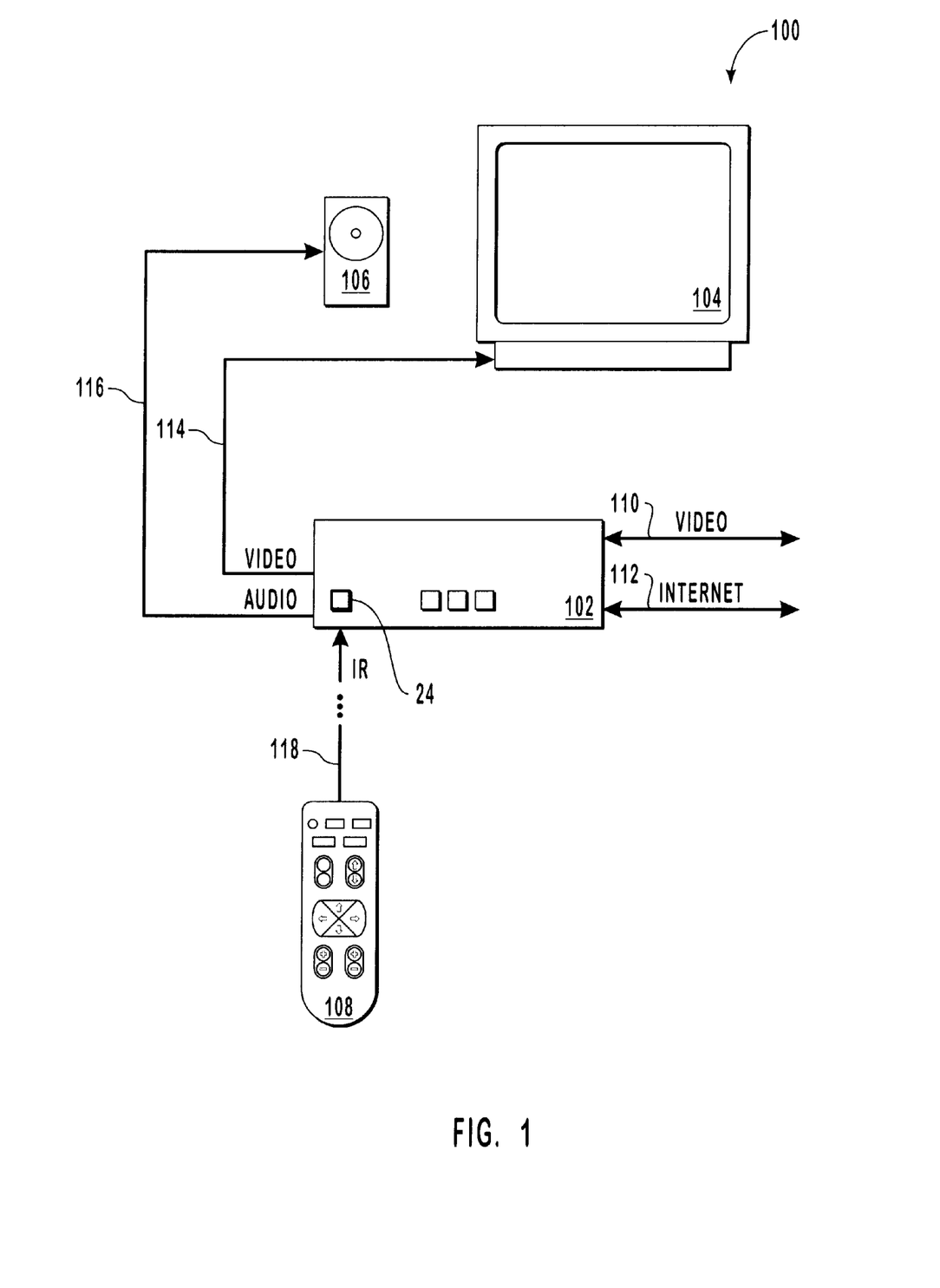
FIG. 1 is a schematic drawing of a suitable operating environment for the present invention.

FIG. 1 illustrates a video system 100 that represents a suitable operating environment for the present invention. The video system 100 might include, for example, a video cassette recorder, a cable box, or any other apparatus or combination that is capable of receiving a video signal. In one embodiment as shown in FIG. 1, the video system 100 is a WebTV® client. While the invention can be advantageously implemented in the environment illustrated in FIGS. 1 and 2, it can also be practiced in any number of other systems that will be understood by those skilled in the art upon learning of the disclosure made herein.

The video system 100 of FIG. 1 includes a means for receiving viewable video image data, a means for receiving the associated video sound data, and a means for recognizing or identifying patterns in the viewable video image data and/or the video sound data to identify the video segment represented by the viewable video image data and the video sound data. These means are shown collectively and by way of example in FIG. 1 as management device 102. In this description and in the claims, "video" data includes both the viewable portions of the moving image data (herein, "viewable video image data") and its associated sound data (herein, "video sound data"). The video system 100 also includes a means for displaying the viewable video image data (e.g., display device 104), a means for realizing the video sound data (e.g., speaker device 106), and a means for receiving instructions (e.g., input device 108).

The management device 102 may be any device capable of receiving viewable video image and video sound data over, for example, video input line 110. The management device 102 may be integrated with the display device 104. Alternatively, the management device 102 may stand separate from the display device 104. For example, the management device 102 may be a WebTV® set top box. Optionally, the management device 102 includes an Internet connection line 112 for bidirectional data exchange over the Internet such as when the management device 102 is a WebTV® set top box being capable of communicating over the Internet as well as being capable of receiving video data.

The display device 104 may be any device capable of displaying viewable video image data such as the video image data provided by the management device 102 over a video image link 114. For example, the display device 104 may be a computer monitor, a high definition television display, a standard television display, a flat panel display, a projection device, or any other display device.

The speaker device 106 may be any device capable of realizing video sound data such as the video sound data provided by the management device 102 over a video sound link 116. The speaker device 106 may be a speaker integrally positioned with respect to the display device 104. For example, the display device 104 may be a television monitor, and the speaker device 106 may be a television speaker integrated with the television monitor.

The input device 108 may be any device capable of generating electronic instructions for control of the management device 102. The input device 108 is communicatively coupled to the management device 102 over an input link 118 so as to enable such control. For example the input device 108 may cause the management device 102 to change the channel tuned from the video data, to change the brightness and contrast of the viewable video image data, to change the volume of the video sound data, and any other instruction capable of being fulfilled by the management system 102. Optionally the input device 108 may control Web browser software within the management system 102 as when the management system 102 is a WebTV® set top box.

The input device 108 may generate electronic instructions over the input link 118 in response to preprogrammed data. For example, the input device 108 may be programmed to turn on the management device 102 and tune the management device 102 to a predetermined channel at a predetermined time. In addition, the input device 108 may generate electronic instructions over the input link 118 in response to a viewer pressing buttons on the input device 102. In FIG. 1, the input device 108 is shown as being separate from the management system 102 as when the input device 108 is a remote control, and as when the input link 118 is wireless. However, input device 108 may also be integrated with the management device 102, and the input link 118 may also be wired.

A means for providing video image data from the management device 102 to the display device 104 is shown by way of example as video image link 114. Video image link 114 may be any link capable of providing video image data to the display device 104 such as, for example, a radio-frequency (RF) link, an S-video link, a composite link 29, or any other equivalent form of video image link.

A means for providing video sound data from the management device 102 to the speaker device 106 is shown by way of example as video sound link 116. Video sound link 116 may be any link capable of providing video sound data to the speaker device 106 such as, for example, a radio-frequency (RF) link, a wired link, or any other equivalent form of video sound link.

Figure 2:
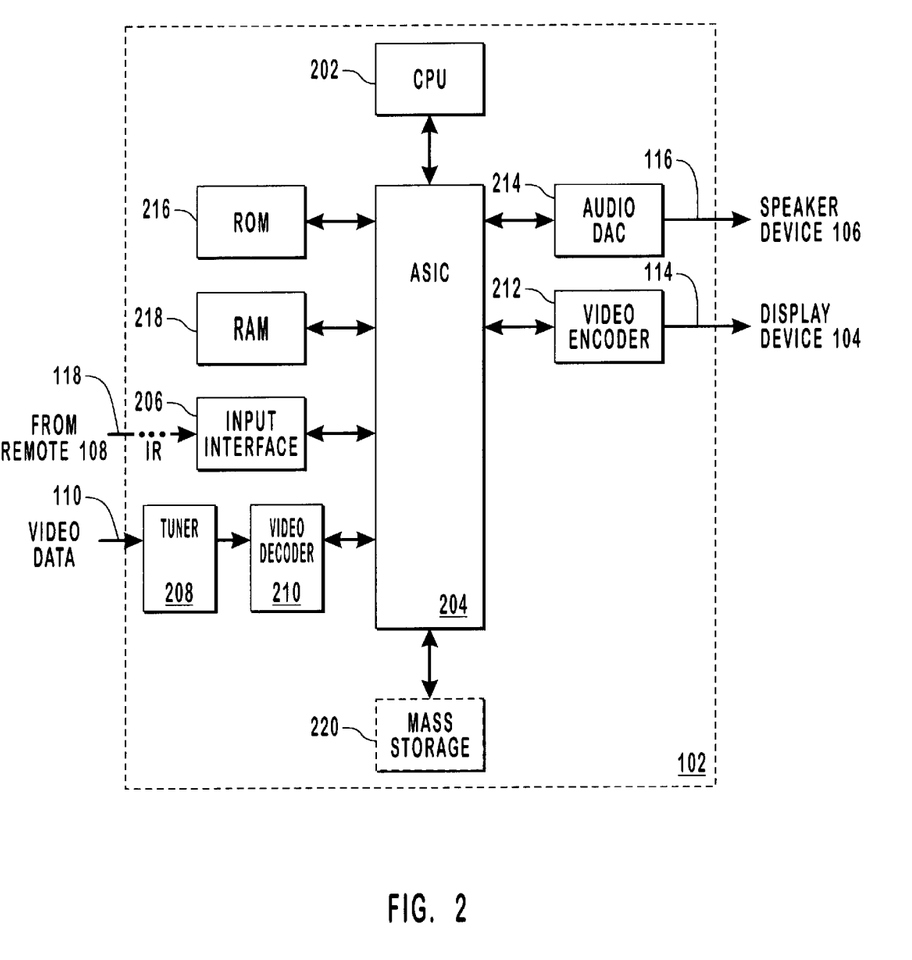
FIG. 2 is a schematic drawing of the management device of FIG. 1.

FIG. 2 is a block diagram of the internal features of the management device 102. The operation of the management device 102 is controlled by a Central Processing Unit (CPU) 202, which is coupled to an Application-Specific Integrated Circuit (ASIC) 204. The CPU 202 executes software designed to implement features of the management device 102 including some of the features of the present invention. The ASIC 204 contains circuitry which is used to implement certain functions of the management device 102. Instructions, data, and other software necessary for the herein described operation of the CPU 202 and ASIC 204 may be stored, for example, in a read-only memory (ROM) 216, a random-access memory (RAM) 218, and/or a mass storage device 220. Mass storage device 220 may be any mass memory means capable of storing large amounts of data such as a magnetic or optical disk drive. The ROM 216, the RAM 218 and the mass storage device 220 are communicatively coupled to the ASIC 204 so as to be readable by the ASIC 204 and so that data may be written from the ASIC 204 to the RAM 218 and possibly the mass storage device 220.

The management device 102 includes a means for providing video image data on the video image link 114 to the display device 104, a means for providing video sound data on the video sound link 116 to the speaker device 106, and a means for recognizing or identifying patterns in the viewable video image data and/or the video sound data to identify video segments. As these means are described hereinafter the remainder of the devices of the management device 102 will also be described.

If the video data on the video input line 110 includes video data of multiple channels, the means for providing and recognizing the video data include a means for tuning to a desired channel of the video data on the video input line 110. The means for tuning is represented in FIG. 2 as tuner 208. The tuner 208 may include any device capable of tuning to a desired channel of a video signal such as those conventionally known.

The tuner 208 may be controlled with the input device 108. Specifically, referring to FIG. 1, the input device 108 generates an electronic instruction to tune to a desired channel, and provides that electronic instruction over the input link 118 to the management device 102. Referring to FIG. 2, the electronic instruction is received by an input interface 206, and provided to the ASIC 204. The ASIC 204 transforms the electronic instruction, if necessary, to be recognizable by the tuner 208. The electronic instruction is then transmitted to the tuner 208.

If the tuner 208 provides the tuned channel in an analog format, and if the ASIC 204 can process the video data in an analog fashion, then a video decoder 210 is not provided. Similarly, if the tuner 208 provides the tuned channel in a digital format, and if the ASIC 204 can process the video data in the digital format, then the video decoder 210 is not provided. However, in one embodiment, the tuner 208 provides the tuned channel in an analog format and the ASIC 204 processes video data in a digital format. In this case, a means for converting video data from analog to digital format (i.e., video decoder 210) is provided between the tuner 208 and the ASIC 204 to convert the video data from the analog output of the tuner 208 to the digital input for the ASIC 204.

Once the ASIC 204 receives the video data, the video data is processed by the ASIC 204 as described in further detail below to recognize patterns in the viewable video image data and/or the video sound data in order to identify the associated video segment. The ASIC 204 then outputs the video image data and the video sound data separately.

If the ASIC 204 provides the video image data in a format not recognized by the display device 104 (FIG. 1), then the means for providing video image data on the video image link 114 also includes a video encoder 212 for encoding the video image data in the format recognized by the display device 104. For example, if the ASIC 204 outputs the video image data digitally, and the display device 104 only recognizes an analog format, the video encoder 212 would convert the video image data from the digital format to the analog format and provide the analog video image data on the video link 114. Similarly, if the ASIC 204 provides the video sound data in a digital format, and the speaker device 106 recognizes only sound data in analog format, then the means for providing video sound data on the video sound link 116 includes an audio digital-to-analog converter (DAC) 214.

As mentioned above, the ASIC 204 includes a means for recognizing or identifying patterns in the viewable video image data and/or the video sound data to identify an associated video segment. The ASIC 204 operates in conjunction with the CPU 202 and uses computer-executable instructions and/or hardwired logic circuitry to perform the steps set forth in the flowchart of FIG. 3. These computer-executable instructions may be stored in ROM 216, RAM 218, or mass storage device 220.

Figure 3:
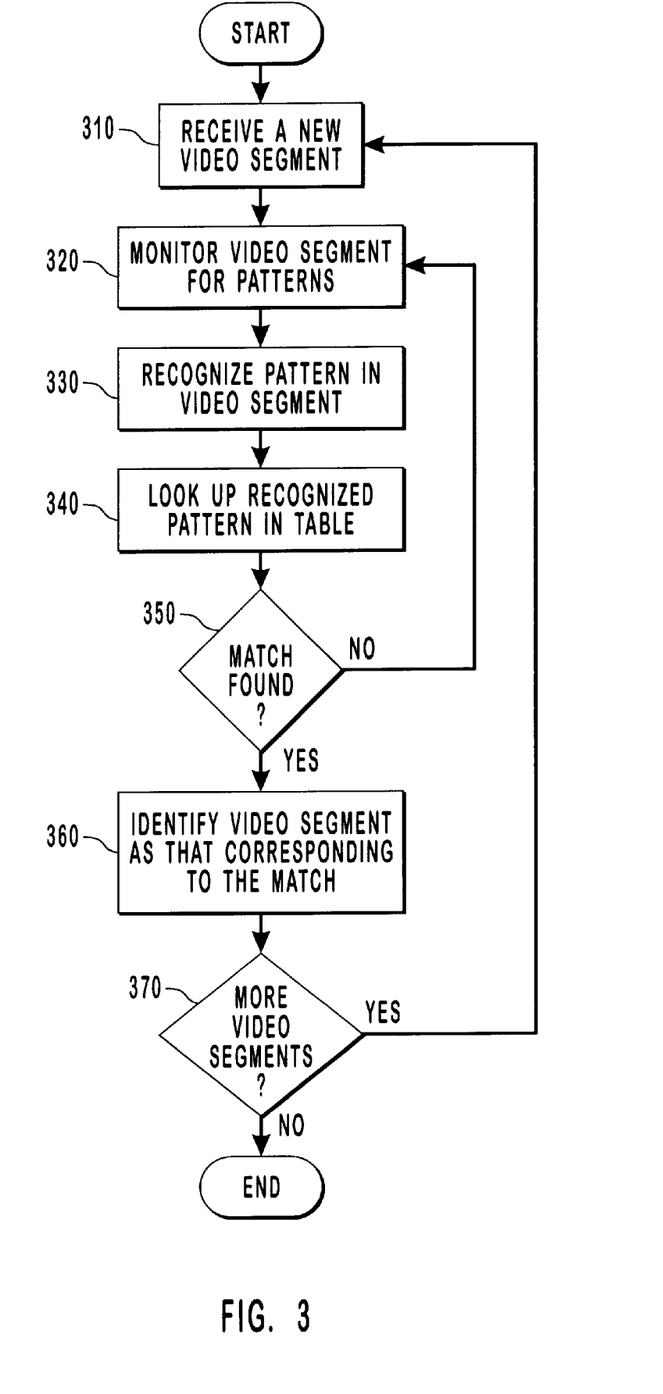
FIG. 3 is a flowchart illustrating a method of identifying video segments performed by the management device of FIG. 2.

Referring to FIG. 3, a new video segment is received (step 310) at, for example, the ASIC 204. The video segment is then monitored for patterns (step 320). After a pattern is recognized in the video segment (step 330), the recognized pattern is then looked up in a table (340) correlating various patterns with an identification of video segments that can be expected to include such patterns. If a match is not found in the video segment ("NO" in decision block 350), the process continues to monitor the video segment (step 320) to recognize and look up other patterns (steps 330 and 340) until a match is found in the table ("YES" in decision block 350).

After a match is found, then the video segment is identified as being the video segment that corresponds to the pattern in the table (step 360). The management unit 102 might perform any number of functions with this identification. For example, if the video segment is identified as being a commercial for a specific product, the management unit might cause an icon to be displayed on the display device 104. If the viewer selects the icon, the management unit 102 might, for example, transmit a Web page request corresponding to the product advertised so that the viewer can obtain more information concerning the product if desired.

After the identification of the current video segment (step 360), the management device 102 determines whether there are more video segments (decision block 370). It may be that as long as the television is on, the management unit 102 should continue to try to identify each successive video segment. In this case, it may be determined that as long as the display device 104 is still on, there are more video segments. Alternatively, a viewer may indicate that the viewer no longer desires for the management unit 102 to recognize video segments. In this case, the viewer indicates that there are no more video segments to identify.

If there are more video segments ("YES" in decision block 370), the process awaits a new video segment (step 310) at which time the above described process repeats. This repetition ceases when it is determined that there are no more video segments to be recognized ("NO" in decision block 370).

The video segment producers themselves may provide the pattern entries in the table checked in step 330. This may especially be the case when the video segment is a commercial. The commercial producer may have an incentive to publicize distinct patterns related to their commercial since this would allow identification. This identification might allow potential customers that have a particular interest in the product to access a corresponding Web page and potentially place an order over the Internet. Alternatively, video segments may be evaluated by third parties other than the video segment producer to determined unique identifying patterns in the video segment.

The invention extends to the construction of the tables or other databases in which the video segment identification information is stored. For example, the set-top box or other management device can receive the information relating to known commercials and known patterns included in video segments from remote entities, such as those operated by parties associated with the commercials or third parties not associated with the commercials. The invention also extends to processes in which the management device, itself, selects patterns of known commercials and stores information relating to the selected patterns in a table or another database. In this manner, the management device can construct the database without a remote entity specifically providing information relating to the known patterns to be included in the database.

The patterns recognized in step 330 will depend on the list of patterns stored in the table. For example, if the table includes audio patterns, the management unit 102 will search for such audio patterns in the video segment. If the table includes image patterns, the management unit 102 will search for such image patterns in the video segment.

The present invention is not limited to any particular methodology used to recognize patterns in a video segment. However, at this point, it may be useful to describe several methods that may be used to recognize such a pattern. A first method is described with respect to FIG. 4 and FIG. 5.

Figure 4:
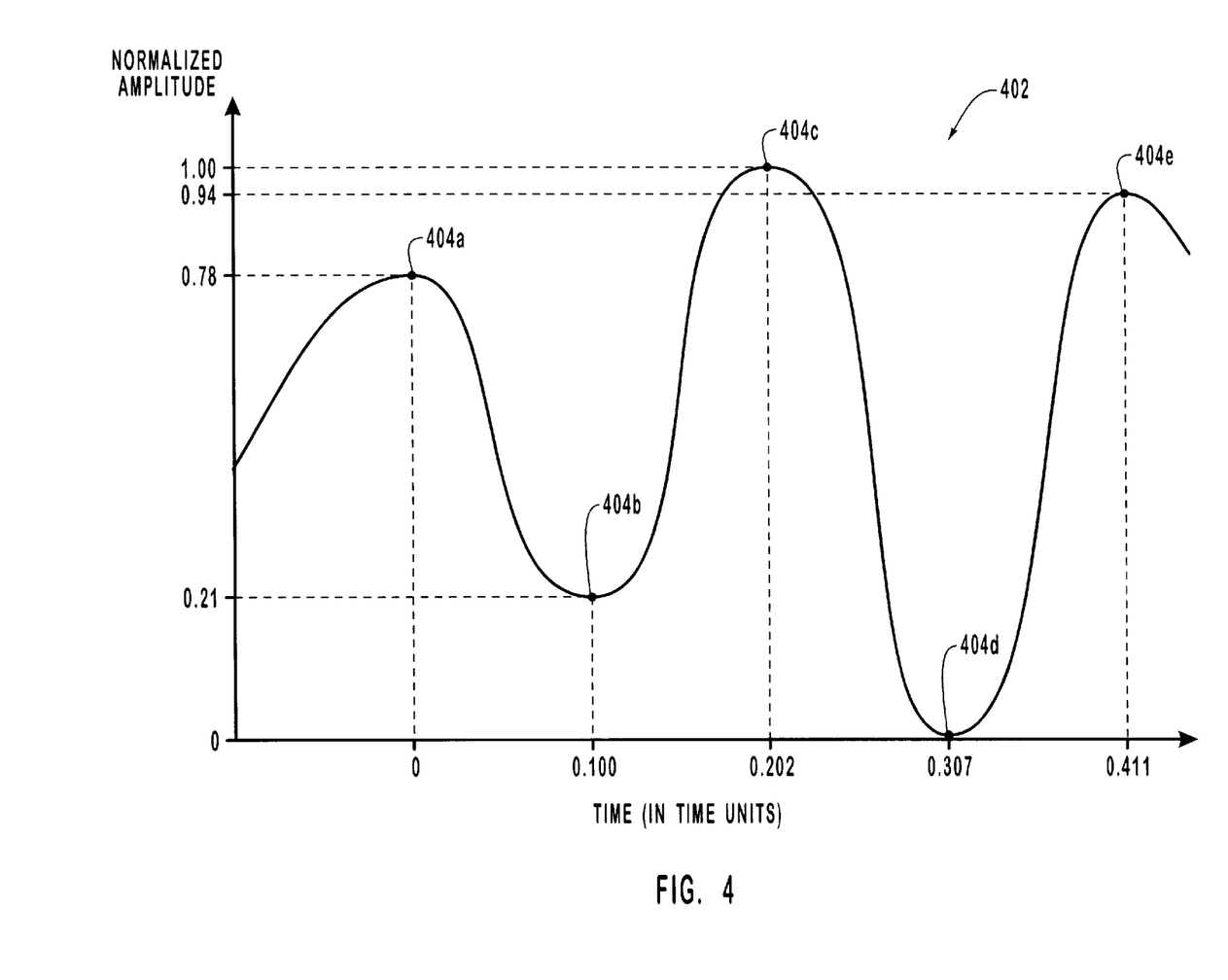
FIG. 4 is a waveform used to recognize a pattern for identifying the video segment.
Figure 5A:
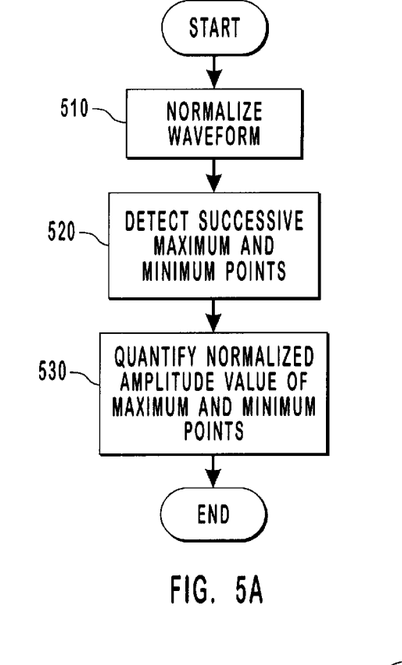
FIGS. 5A, 5B and 5C are flowcharts illustrating alternative methods of recognizing a pattern in video data.

FIG. 4 includes a waveform 402 that represents an audio signal representing a portion of the video sound data of the video segment being monitored in step 320 of FIG. 3. The vertical axis (i.e., y-axis) represents the normalized amplitude of the audio signal, and the horizontal axis (i.e., x-axis) from left to right represents the passage of time. The recognition of the pattern (step 330 of FIG. 3) with regard to the waveform 402 of FIG. 4 is shown in the flowchart of FIG. 5A.

Initially, the waveform 402 is normalized (step 510 of FIG. 5A) such that its maximum value of the waveform is scaled to a fixed number such as one and the minimum value of the waveform is scaled to a fixed number such as zero as shown in FIG. 4. Next, the successive maximum and minimum points are detected (step 520) as represented by points 404a, 404b, 404c, 404d, and 404e of FIG. 4. The normalized amplitude values of these maximum and minimum values can then be quantified (step 530). For example, in FIG. 4, the values corresponding to points 404a, 404b, 404c, 404d, and 404e are 0.78, 0.21, 1.00, 0.00, and 0.94, respectively. This sequence of values can be considered a pattern and recognized as such in step 330 of FIG. 3.

These values may be provided to the table in step 340 of FIG. 3 in order to look up the value. A similar set of values provided by the producer of the video segment that generated the waveform 402 would be included in the table. A match would be determined to occur if the values fell within a certain tolerance from the values provided by the video segment producer. For example, if the tolerance were ±0.01 for each value, the values of 0.78, 0.21, 1.00, 0.00, and 0.94 would be considered to match the values of 0.77, 0.20, 1.00, 0.00, and 0.95 in the table.

Figure 5B:
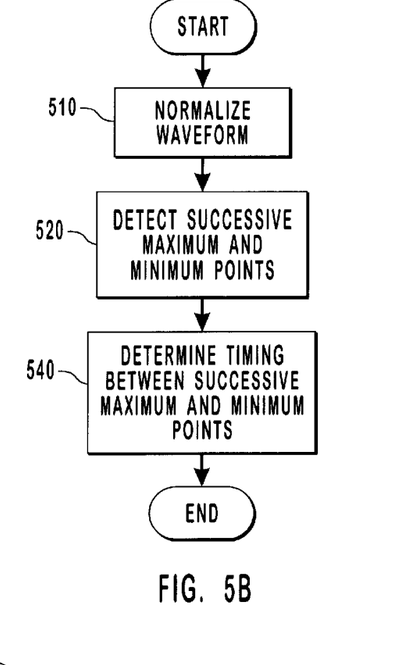

FIG. 5B shows an alternative method for recognizing a pattern in a video segment with respect to the waveform 402 of FIG. 4. The method of FIG. 5B is similar to the method of FIG. 5A in that the waveform 402 is normalized (step 510), and the successive maximum and minimum points are found (step 520). However, instead of quantifying the successive maximum and minimum values (step 530 of FIG. 5A), the timing between the successive maximum and minimum points is determined (step 540 of FIG. 5B)). For example, the time between points 404a and 404b is determined to be 0.100 time units, the time between points 404b and 404c is determined to be 0.102 time units, the time between points 404c and 404d is determined to be 0.105 time units, and the time between points 404d and 404e is determined to be 0.104 units. These time differences are then provided to the table to determine if a match is found with time difference entries in the table.

Figure 5C:
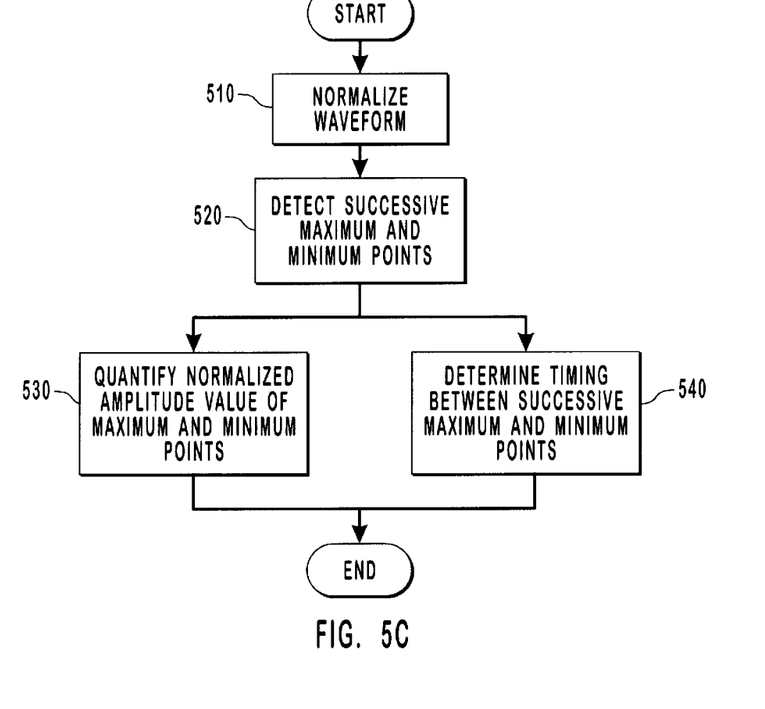

FIG. 5C shows yet another alternative method in using steps 530 and 540 in parallel. Specifically, the normalized maximum and minimum values of the waveform 402 are determined (step 530) as well as the time difference between the maximum and minimum values (step 540).

The above description with regard to FIGS. 5A, 5B, and 5C illustrates a way of recognizing patterns in video segments (step 330 of FIG. 3) using video sound data. However, many other methods of recognizing patterns in video sound data may be used in accordance with the present invention. In the example of FIGS. 5A, 5B, and 5C, the waveform 402 may be formulated using the amplitude of the video sound data with respect to time.

Patterns may also be found in the viewable video image data to identify the video segment. In video image recognition, a waveform similar to waveform 402 could be constructed by determining values for each consecutive frame. This value might be an average or median intensity value, an average or median color value for a given color, or any other video image parameter. The frame value might also be restricted to pixel values within a certain portion of the frame.

Figure 6:
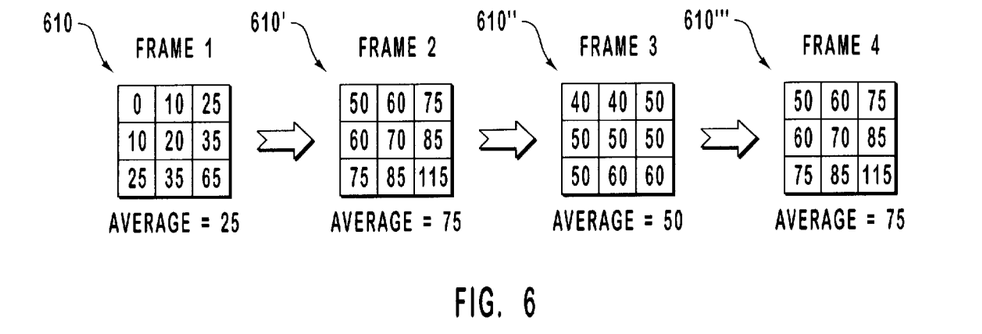
FIG. 6 is a flow diagram showing four successive blocks of pixel values.
Figure 7:
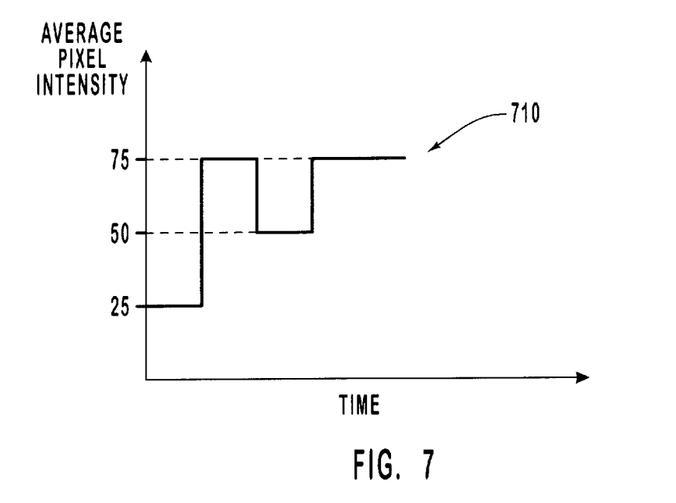
FIG. 7 shows a waveform corresponding to the pixel values of FIG. 6.
Figure 8:
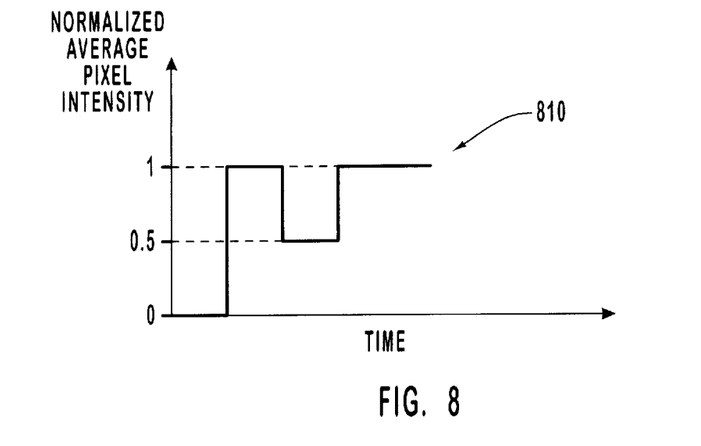
FIG. 8 shows a normalized waveform corresponding to the waveform of FIG. 7.

FIG. 6 is provided to illustrate a specific example of a video image pattern recognition. In this example, a 3 by 3 block of pixels 610 is used to find a value from each frame. In the first frame, the block of pixels has an average pixel intensity value of 25. In the same block 610' of the next frame, the average value is 75. In the same block 610'' of the third frame, the average value is 50. In the same block 610''' of the fourth frame the average value is 75. From these values, a waveform 710 may be formed as shown in FIG. 7. Note that the value for each frame could also have been obtained using conventional discrete cosine analysis. The waveform 710 of FIG. 7 may be normalized as shown in the waveform 810 of FIG. 8 just as the sound waveform 402 of FIG. 4 was normalized in step 510 of FIGS. 5A, 5B and 5C. Similarly, the successive maximum and minimum points may be found as in step 520 of FIGS. 5A, 5B and 5C. Finally, a pattern is recognized by quantifying the amplitude and/or timing of the successive maximum and minimum values similar to steps 530 of FIGS. 5A and 5C, and similar to step 540 of FIGS. 5B and 5C.

Thus, the above describes a system and method for recognizing a pattern in a video segment using the viewable video image data and/or the video sound data to identify the video segment. Since this identification process does not rely on the existence of identification data in the vertical blanking interval or any other non-displayed portion of the video data, the identification process may be implemented even if the non-displayed portions of the video data are not available to identify the video segment.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed and desired to be secured by United States Letters Patent is:

1. In a management device associated with a display device that can display video images, a method for identifying a video segment as being a particular known commercial such that the management device can provide a viewer with access to additional information associated with the particular known commercial, the method comprising the steps of:

receiving video data representing the video segment, the video data including video image data;

analyzing a pixel intensity of one or more frames of the video image data with discrete cosine analysis to automatically identify a pattern associated with the video segment;

comparing the identified pattern against a database of known patterns representative of individual video segments that are known to be commercials;

matching the identified pattern with a particular known pattern included in the database of known patterns so as to identify the video segment as being a particular known commercial; and in response to identifying the video segment as being the particular known commercial, modifying an image displayed on the display device so as to provide the viewer with access to additional information associated with the particular known commercial.

2. A method according to claim 1, further comprising, prior to the step of receiving the video data representing the video segment, the step of constructing the database of known patterns by receiving at the management device data representing the particular known pattern from a remote entity.

3. A method according to claim 2, wherein the remote entity is operated by a party associated with the commercial.

4. A method according to claim 1, wherein the step of analyzing a waveform is performed to automatically identify a pattern of the viewable video image data within the video segment.

5. A method according to claim 1, wherein the step of analyzing a waveform is performed to automatically identify a pattern of the video sound data within the video segment.

6. A method according to claim 1, further comprising the following steps:

providing the viewable video image data over a video link to the display device; and providing the video sound data over a sound link to a speaker device.

7. In a management device associated with a display device that can display video images, a method for identifying a video segment as being a commercial, the method comprising the steps of:

receiving video data representing the video segment, the video data including both video image data and associated video sound data;

analyzing a waveform associated with at least one of the video image data and the video sound data to automatically identify a pattern associated with the video segment by performing the steps of:

normalizing the amplitude of the waveform;

detecting successive maximum and minimum points of the normalized amplitude; and quantifying the successive maximum and minimum points;

comparing the identified pattern against a database of known patterns representative of individual video segments that are known to be commercials; and matching the identified pattern with a particular known pattern included in the database of known patterns so as to identify the video segment as being a particular known commercial.

8. A method according to claim 7, further comprising, prior to the step of receiving the video data representing the video segment, the step of constructing the database of known patterns by receiving at the management device data representing the particular known pattern from a remote entity.

9. A method according to claim 7, wherein the remote entity is operated by a party associated with the commercial.

10. A method according to claim 7, wherein the step of analyzing a waveform is performed to automatically identify a pattern of the viewable video image data within the video segment.

11. A method according to claim 7, wherein the step of analyzing a waveform is performed to automatically identify a pattern of the video sound data within the video segment.

12. In a management device associated with a display device that can display video images, a method for identifying a video segment as being a commercial, the method comprising the steps of:

receiving video data representing the video segment, the video data including both video image data and associated video sound data;

analyzing a waveform associated with at least one of the video image data and the video sound data to automatically identify a pattern associated with the video segment by performing the steps of:

normalizing the waveform;

detecting successive maximum and minimum points of the normalized waveform; and determining a timing between the successive maximum and minimum points;

comparing the identified pattern against a database of known patterns representative of individual video segments that are known to be commercials; and matching the identified pattern with a particular known pattern included in the database of known patterns so as to identify the video segment as being a particular known commercial.

13. A method according to claim 12, further comprising, prior to the step of receiving the video data representing the video segment, the step of constructing the database of known patterns by receiving at the management device data representing the particular known pattern from a remote entity.

14. A method according to claim 12, wherein the remote entity is operated by a party associated with the commercial.

15. A method according to claim 12, wherein the step of analyzing a waveform is performed to automatically identify a pattern of the viewable video image data within the video segment.

16. A method according to claim 12, wherein the step of analyzing a waveform is performed to automatically identify a pattern of the video sound data within the video segment.

17. In a management device associated with a display device that can display video images, a method for identifying a video segment as being a commercial, the method comprising the steps of:

receiving video data representing the video segment, the video data including both video image data and associated video sound data;

analyzing a waveform associated with at least one of the video image data and the video sound data to automatically identify a pattern associated with the video segment by performing the steps of:

normalizing the amplitude of the waveform;

detecting successive maximum and minimum points of the normalized amplitude;

quantifying the successive maximum and minimum points; and determining a timing between the successive maximum and minimum points;

comparing the identified pattern against a database of known patterns representative of individual video segments that are known to be commercials; and matching the identified pattern with a particular known pattern included in the database of known patterns so as to identify the video segment as being a particular known commercial.

18. A method according to claim 1, wherein the additional information corresponds to a product associated with the particular known commercial.

19. A method according to claim 1, wherein the step of modifying the image comprises the step of displaying an icon on the display device that enables the viewer to access the Internet and obtain the additional information.

20. A method according to claim 17, further comprising, prior to the step of receiving the video data representing the video segment, the step of constructing the database of known patterns by receiving at the management device data representing the particular known pattern from a remote entity.

21. A method according to claim 17, wherein the remote entity is operated by a party associated with the commercial.

22. A method according to claim 17, wherein the step of analyzing a waveform is performed to automatically identify a pattern of the viewable video image data within the video segment.

23. A method according to claim 17, wherein the step of analyzing a waveform is performed to automatically identify a pattern of the video sound data within the video segment.

24. A computer program product for use in a management device associated with a display device that can display video images, the computer program product including computer-readable media for implementing a method for identifying a video segment as being a commercial, the method comprising:

receiving video data representing the video segment, the video data including both video image data and associated video sound data;

analyzing a waveform associated with at least one of the video image data and the video sound data to automatically identify a pattern associated with the video segment by performing the steps of:

normalizing the amplitude of the waveform;

detecting successive maximum and minimum points of the normalized amplitude; and quantifying the successive maximum and minimum points;

comparing the identified pattern against a database of known patterns representative of individual video segments that are known to be commercials; and matching the identified pattern with a particular known pattern included in the database of known patterns so as to identify the video segment as being a particular known commercial.

25. A computer program product according to claim 24, further comprising, prior to the step of receiving the video data representing the video segment, the step of constructing the database of known patterns by receiving at the management device data representing the particular known pattern from a remote entity.

26. A computer program product according to claim 24, wherein the step of analyzing a waveform is performed to automatically identify a pattern of the viewable video image data within the video segment.

27. A computer program product according to claim 24, wherein the step of analyzing a waveform is performed to automatically identify a pattern of the video sound data within the video segment.

28. A computer program product for use in a management device associated with a display device that can display video images, the computer program product including computer-readable media for implementing a method for identifying a video segment as being a commercial, the method comprising:

receiving video data representing the video segment, the video data including both video image data and associated video sound data;

analyzing a waveform associated with at least one of the video image data and the video sound data to automatically identify a pattern associated with the video segment by performing the steps of:
normalizing the waveform;
detecting successive maximum and minimum points of the normalized waveform; and
determining a timing between the successive maximum and minimum points;

comparing the identified pattern against a database of known patterns representative of individual video segments that are known to be commercials; and matching the identified pattern with a particular known pattern included in the database of known patterns so as to identify the video segment as being a particular known commercial.

29. A computer program product according to claim 28, further comprising, prior to the step of receiving the video data representing the video segment, the step of constructing the database of known patterns by receiving at the management device data representing the particular known pattern from a remote entity.

30. A computer program product according to claim 28, wherein the step of analyzing a waveform is performed to automatically identify a pattern of the viewable video image data within the video segment.

31. A computer program product according to claim 28, wherein the step of analyzing a waveform is performed to automatically identify a pattern of the video sound data within the video segment.

32. A computer program product for use in a management device associated with a display device that can display video images, the computer program product including computer-readable media for implementing a method for identifying a video segment as being a commercial, the method comprising:

receiving video data representing the video segment, the video data including both video image data and associated video sound data;

analyzing a waveform associated with at least one of the video image data and the video sound data to automatically identify a pattern associated with the video segment by performing the steps of:
normalizing the amplitude of the waveform;
detecting successive maximum and minimum points of the normalized amplitude;
quantifying the successive maximum and minimum points; and
determining a timing between the successive maximum and minimum points;

comparing the identified pattern against a database of known patterns representative of individual video segments that are known to be commercials; and matching the identified pattern with a particular known pattern included in the database of known patterns so as to identify the video segment as being a particular known commercial.

33. A computer program product according to claim 32, further comprising, prior to the step of receiving the video data representing the video segment, the step of constructing the database of known patterns by receiving at the management device data representing the particular known pattern from a remote entity.

34. A computer program product according to claim 32, wherein the step of analyzing a waveform is performed to automatically identify a pattern of the viewable video image data within the video segment.

35. A computer program product according to claim 32, wherein the step of analyzing a waveform is performed to automatically identify a pattern of the video sound data within the video segment.

* * * * *

UNITED STATES PATENT AND TRADEMARK OFFICE
CERTIFICATE OF CORRECTION

PATENT NO. : 6,577,346 B1  Page 1 of 1
DATED : June 10, 2003
INVENTOR(S) : Stephen G. Perlman It is certified that error appears in the above-identified patent and that said Letters Patent is hereby corrected as shown below:

Column 1,
Line 58, after "out" insert -- of --

Column 2,
Line 60, after "depict" delete "("

Column 3,
Line 60, after "which can" insert -- be --

Column 4,
Line 12, after "or other" delete "expression" and insert -- expression --
Line 61, after "line 112 for" delete "bidirectional" and insert -- bi-directional --

Column 7,
Line 66, after "producer to" delete "determined" and insert -- determine --

Column 9,
Line 1, after "of FIG. 5B)" delete the second instance of ")"

Signed and Sealed this

Sixteenth Day of March, 2004

JON W. DUDAS
*Acting Director of the United States Patent and Trademark Office*